Jan. 25, 1938.  F. J. SCHWARTZ  2,106,438
DRAPERY HANGER
Filed July 24, 1936
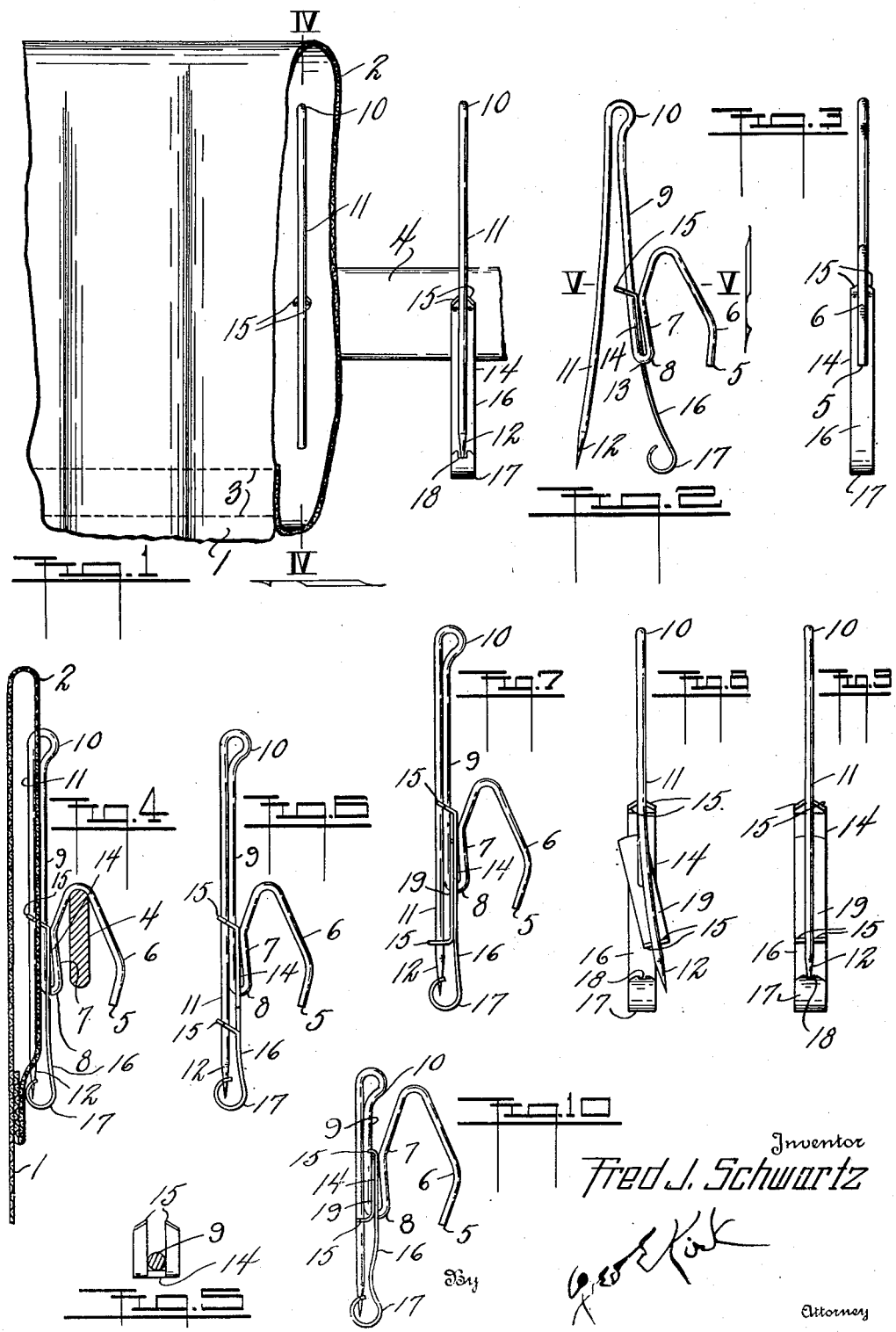
Inventor
Fred J. Schwartz
By
Attorney Patented Jan. 25, 1938

2,106,438

UNITED STATES PATENT OFFICE 2,106,438

DRAPERY HANGER

Fred J. Schwartz, Toledo, Ohio

Application July 24, 1936, Serial No. 92,407

8 Claims. (Cl. 156—21)

This invention relates to detachable connectors, especially adapted to mount sheet material on a support.

This invention has utility in assembling draperies with rods or supports.

Referring to the drawing:

Fig. 1 is a view, with parts broken away, of a drapery sustained upon a support or bar by an embodiment of the invention herein shown as a clamp, pin and hook structure;

Fig. 2 is a side elevation, in open disconnected position, of a connector of Fig. 1;

Fig. 3 is a view of the connector of Fig. 2 from the right thereof;

Fig. 4 is a view on the line IV—IV, Fig. 1;

Fig. 5 is an enlarged view on the line V—V, Fig. 2;

Fig. 6 is a view of a connector similar to the connector of Fig. 4, but embodying a plurality of pairs of drapery engaging teeth;

Fig. 7 is a view of a connector similar to the connector of Fig. 6, wherein the drapery gripping prongs or teeth are carried by independent members;

Fig. 8 is a view of the connector of Fig. 7 from the left thereof, showing the swingable mounting of one of the prong members permitting ready closing of the device;

Fig. 9 is a view of the connector of Fig. 8, with the pin snapped into closed position; and Fig. 10 is a side view of a modified connector embodying a shortened drapery support and a single pair of drapery engaging prongs carried by a member independent of the pin engaging overhang.

Drapery or hanging 1 is shown having upper trim portion or section 2, the extent thereof being determined by stitching 3. In mounting draperies or like hangings hereunder, such may be primarily supported or carried by bar 4 adjacent the window, other opening, or desired place for mounting. In practice, it is not desirable to have the hangings lay over the bar 4, nor is it desirable to have the bar 4 exposed, but to have the entire supporting mechanism concealed. These results are readily accomplished by the devices of the invention herein for connectors between the primary supporting bar or rod 4 and the draperies 1. Furthermore, due to their novel construction, the connectors are economically produced and readily installed.

A piece of wire, of desired dimensions and of some temper to provide a suitable springiness, is bent to provide a support or hook portion 5 having opposing leg portions 6, 7, the latter terminating in a first return bend 8 from which extends intermediate portion 9 normally beyond the hook extent to second return bend 10. From this second return bend 10, the wire bar or rod has pin portion 11 extending normally beyond the hook 5 portion in the opposite direction to terminate in point 12. The entire sinuous extent of the connectors are confined to a single plane thereby permitting the use of simple dies in the production thereof and reducing production costs to a minimum.

The return bend 8 extends through opening 13 of spring plate 14. This plate extends upwardly from the opening 13 clamped between the portions 7, 9, and terminates in a pair of teeth or prongs 15 offset to have the portion 9 gripped therebetween and to extend therebeyond. The clamping of the portion 9 between the prongs 15 anchors the spring plate 14 with the wire portions 7, 9, so that portion 16 of the plate 14 extends outwardly from the return bend 8 to form a continuation of the portion 9. The plate portion 16 has terminal loop or guard 17 providing pin point receiving seat 18.

Due to the inherent springiness of the materials employed, the connector in open position has the portion 11 and the combined portions 9, 16, normally curved outwardly in opposite directions from the return bend 10, so that when the pin is closed there is thus a secure locking between the parts.

In installation of a drapery, the point 12 may be thrust downwardly through the drapery material near the top of the trim portion and again through the material near the bottom of the trim. When the exposed point 12 is then moved into the seat 18, the material is firmly clamped between the engaging portions 9, 11. Furthermore, the prongs or teeth 15 are of such an extent that they not only provide a seat therebetween for the portion 11 but may extend into or through the material of the draperies for further secure holding thereof. The material is thus firmly gripped and held in position with a portion thereof extending above the return bend 10, the hook is placed in position on the rod 4, and the entire mounting mechanism is completely concealed. The number of connectors and their spacing along the drapery may be determined by the size, style and weight of the material used.

In some instances it may be desired to provide a plurality of pairs of fabric gripping teeth 15. To this end, the plate extension 16 may have additional prongs 15 bent outwardly therefrom so that the fabric may be gripped at a multiple of places (Fig. 6). To facilitate shifting the pin point 12 into the seat 18, wherein a multiple of pairs of teeth are employed, a pair thereof may be on a separate member 19 swingable on the connector at the return bend 8 (Figs. 8, 9). This not only allows ready assembly but strengthens the finished assembly. The member 19 may provide teeth adjacent the loop 17 or close to the return bend 8 (Fig. 10). The return bend 10 may likewise be adjacent the hook 5 (Fig. 10) or spaced a desired distance therefrom.

What is claimed and it is desired to secure by United States Letters Patent is:

1. A drapery hanger comprising a wire hook, a first return bend extension from said hook, a second return bend extension from the first extension terminating in a pin, and a spring plate fixed to said hanger adjacent the first return bend, said plate providing a pin engaging terminus.

2. A drapery hanger comprising a wire hook, a first return bend extension from said hook, a second return bend extension from the first extension terminating in a pin, a spring plate provided with an opening through which the first return bend of said hanger extends, said plate extending in two directions therefrom to terminate in one direction in means gripping the first extension between the return bends and in pin coacting means in the opposite direction.

3. A drapery hanger comprising a hook, a drapery engaging extension therefrom terminating in a pin integral with the hook, a spring plate assembled in said hanger parallel to the pin providing a seat for engaging the pin terminus in closed position, and drapery engaging teeth extending from said plate.

4. A drapery hanger comprising a hook, a drapery clamp extension therefrom terminating in a pin integral with the hook, and a spring plate assembled in said hanger parallel to the pin providing a seat for engaging the pin terminus in closed position, said plate providing drapery engaging teeth adjacent the clamp.

5. A drapery hanger comprising a hook, a first return bend extension from said hook, a second return bend extension from the first extension terminating in a pin, a spring plate fixed to said hanger and having a terminus providing a seat for the pin in closed position, and a drapery engaging toothed member mounted on said hanger adjacent said plate.

6. In a drapery hanger, a single piece of spring wire bent to successively form a support-engaging hook, a drapery clamp and a drapery-engaging pin, all in the same plane, and a spring plate fixed to provide a guard for the point of the pin in closed position.

7. A drapery hanger comprising a wire having a support engaging portion for the hanger, a drapery engaging portion, there being spaced from the support portion by the engaging portion, an intermediate portion, said portions being in a common plane for the entire wire throughout, and a lock for the engaging portion in assembled position with the intermediate portion.

8. A drapery hanger having a support engaging portion for the hanger, an extension upward from the support including a return bend and then downward past the support to form a point terminus, said hanger including spring means extending to engage said point terminus as a guard.

FRED J. SCHWARTZ.